United States Patent
Sengodan

(10) Patent No.: US 10,797,587 B1
(45) Date of Patent: Oct. 6, 2020

(54) POWER CONVERTER WITH SNUBBER CIRCUIT

(71) Applicant: Hamilton Sundstrand Corporation, Charlotte, NC (US)

(72) Inventor: Rajkumar Sengodan, Tamilnadu (IN)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/542,990

(22) Filed: Aug. 16, 2019

(30) Foreign Application Priority Data

Jun. 6, 2019 (IN) .............................. 201911022516

(51) Int. Cl.
*H02M 1/34* (2007.01)
*H02M 3/335* (2006.01)

(52) U.S. Cl.
CPC .............. *H02M 1/34* (2013.01); *H02M 3/335* (2013.01); *H02M 2001/346* (2013.01)

(58) Field of Classification Search
CPC ... H02M 1/34; H02M 3/335; H02M 2001/346
See application file for complete search history.

(56) References Cited

U.S. PATENT DOCUMENTS

| | | | |
|---|---|---|---|
| 3,628,047 A * | 12/1971 | Cronin .................... | H02M 1/32 327/544 |
| 4,675,796 A * | 6/1987 | Gautherin ............... | H01F 38/02 363/134 |
| 5,508,903 A | 4/1996 | Alexndrov | |
| 6,473,318 B1 * | 10/2002 | Qian ....................... | H02M 1/34 363/21.12 |
| 6,477,064 B1 | 11/2002 | Weng et al. | |
| 9,780,676 B2 | 10/2017 | Kolar et al. | |
| 2001/0019490 A1 * | 9/2001 | Igarashi .................. | H02M 1/34 363/19 |
| 2007/0047275 A1 | 3/2007 | Hesterman et al. | |
| 2014/0362613 A1 * | 12/2014 | Park ........................ | H02M 1/34 363/21.16 |
| 2015/0085534 A1 | 3/2015 | Abramovitz et al. | |

FOREIGN PATENT DOCUMENTS

EP 2814155 A1 12/2014

OTHER PUBLICATIONS

Zhao, B. et al. "Overview of Dual-Active-Bridge Isolated Bidirectional DC-DC Converter for High-Frequency-Link Power-Conversion System" IEEE Transactions on Power Electronics. vol. 29, No. 8, Aug. 2014, pp. 4091-4106.

* cited by examiner

*Primary Examiner* — Kyle J Moody
(74) *Attorney, Agent, or Firm* — Cantor Colburn LLP

(57) ABSTRACT

Disclosed is a power converter including power conversion circuitry. The power conversion circuitry includes a converter coil. The power conversion circuitry includes a power source. The power conversion circuitry includes a switch connected to the converter coil to control current flowing through the converter coil from the power source, the power conversion circuitry including a converter output connectable to a converter load. The power conversion circuitry includes parallel snubber circuitry having resonant circuitry connected in parallel with the converter coil, the resonant circuitry including a parallel snubber circuitry coil and a capacitor connected in series, the parallel snubber circuitry including a parallel snubber output connectable to a parallel snubber circuitry load.

8 Claims, 4 Drawing Sheets

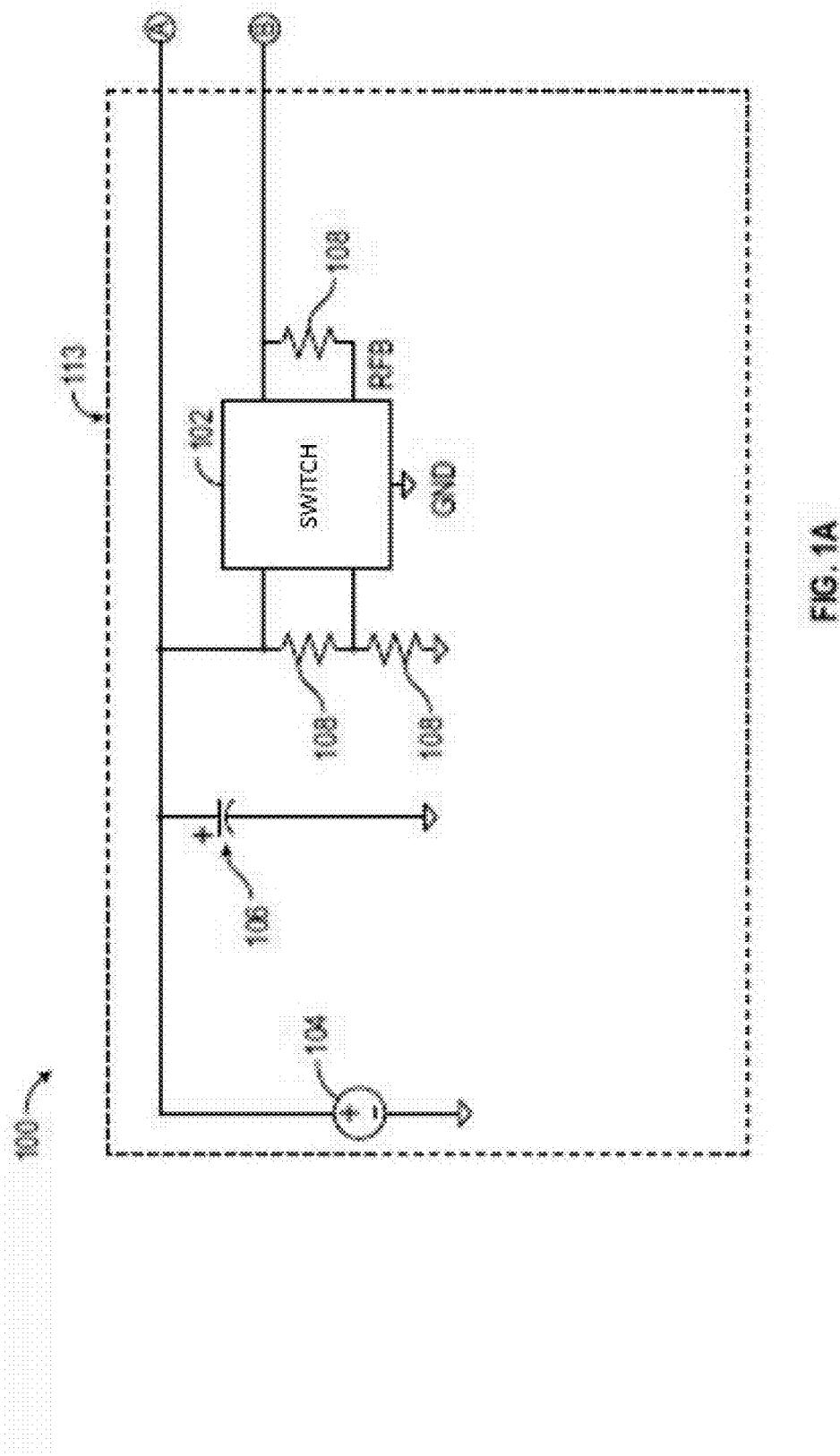

POWER CONVERTER WITH SNUBBER CIRCUIT

CROSS REFERENCE TO RELATED APPLICATIONS

This application is a Non-Provisional Application of Indian Application No. 201911022516 filed Jun. 6, 2019, the disclosure of which is incorporated herein by reference in its entirety.

BACKGROUND

Exemplary embodiments pertain to the art of power converter snubber circuits. Switched-mode power supplies may incur voltage spikes during switching operations. Snubber circuits may be implemented to reduce such transients.

BRIEF DESCRIPTION

Disclosed is a power converter including power conversion circuitry. The power conversion circuitry includes a converter coil. The power conversion circuitry includes a power source. The power conversion circuitry includes a switch connected to the converter coil to control current flowing through the converter coil from the power source, the power conversion circuitry including a converter output connectable to a converter load. The power conversion circuitry includes parallel snubber circuitry having resonant circuitry connected in parallel with the converter coil, the resonant circuitry including a parallel snubber circuitry coil and a capacitor connected in series, the parallel snubber circuitry including a parallel snubber output connectable to a parallel snubber circuitry load.

In addition to one or more of the features described above, or as an alternative, further embodiments may include that the parallel snubber circuitry coil is a first parallel coil of the parallel snubber circuitry, and further comprising, a second parallel coil associated with the first parallel coil to form a parallel snubber circuitry transformer.

In addition to one or more of the features described above, or as an alternative, further embodiments may include that the parallel snubber circuitry transformer is configured to supply power to the parallel snubber circuitry load associated with the parallel snubber circuitry transformer.

In addition to one or more of the features described above, or as an alternative, further embodiments may include that the parallel snubber circuitry transformer has a winding ratio of 9:4 between the first parallel coil and the second parallel coil.

In addition to one or more of the features described above, or as an alternative, further embodiments may include a parallel snubber diode is disposed on a conductive path between the converter coil and the parallel snubber circuitry coil and biased to enable less restrictive current flow from the parallel snubber circuitry coil to the converter coil than from the converter coil to the parallel snubber circuitry coil.

In addition to one or more of the features described above, or as an alternative, further embodiments may include that the switch is associated with a predefined oscillation frequency greater than a resonant frequency of the capacitor and the parallel snubber circuitry coil.

In addition to one or more of the features described above, or as an alternative, further embodiments may include that the capacitor has a capacitance of five microfarads and the parallel snubber circuitry coil has an inductance of 10 microhenries.

In addition to one or more of the features described above, or as an alternative, further embodiments may include that the parallel snubber circuitry coil is bifilar having a first winding portion and a second winding portion.

In addition to one or more of the features described above, or as an alternative, further embodiments may include that the first winding portion and the second winding portion have a combined inductance of 10 microhenries.

In addition to one or more of the features described above, or as an alternative, further embodiments may include series snubber circuitry associated with the converter coil including a series inductor disposed in series with the converter coil and the capacitor with respect to the power source, and a series snubber diode disposed between the parallel and the converter coil.

In addition to one or more of the features described above, or as an alternative, further embodiments may include series snubber circuitry associated with the converter coil including a low dropout voltage regulator in series with the converter coil with respect to the power source.

In addition to one or more of the features described above, or as an alternative, further embodiments may include that series snubber circuitry associated with the converter coil including a flyback transformer in series with the converter coil with respect to the power source.

In addition to one or more of the features described above, or as an alternative, further embodiments may include that the series snubber circuitry has a series snubber circuitry voltage output with a series snubber circuitry voltage polarity opposite a power conversion circuitry polarity of the power conversion circuitry such that a power converter output voltage of the power converter is less the series snubber circuitry voltage output.

In addition to one or more of the features described above, or as an alternative, further embodiments may include that the flyback transformer includes a load side having series snubber circuitry secondary winding, a series snubber circuitry load, and a series snubber diode disposed is biased to enable less restrictive current flow from the series snubber circuitry load to the series snubber circuitry secondary winding than from the series snubber circuitry secondary winding to the series snubber circuitry load.

In addition to one or more of the features described above, or as an alternative, further embodiments may include series snubber circuitry having a series snubber circuitry output configured in series with a parallel snubber circuitry output of the parallel snubber circuitry in series with the converter output.

In addition to one or more of the features described above, or as an alternative, further embodiments may include that the series snubber circuitry includes a series snubber circuitry transformer having a winding ratio of 13:5 between a first series snubber winding and a second series snubber winding.

In addition to one or more of the features described above, or as an alternative, further embodiments may include that the power conversion circuitry includes a power conversion transformer having a winding ratio of 13:5 between a first power conversion winding and a second power conversion winding.

In addition to one or more of the features described above, or as an alternative, further embodiments may include controller circuitry operable to oscillate the switch between an open position and a closed position according to a predetermined output voltage command associated with the power converter.

Also disclosed is a power converter including power conversion circuitry including a converter coil associated with a power supply and a switch configured with a power conversion circuitry output to a converter load associated with the power converter. The power converter includes parallel snubber circuitry associated with the converter coil having a parallel snubber circuitry coil disposed in parallel with the converter coil with respect to the power supply, a parallel snubber diode disposed between the parallel snubber circuitry coil and the converter coil biased to enable less restrictive current flow from the parallel snubber circuitry coil to the converter coil than from the converter coil to the parallel snubber circuitry coil, and a capacitor disposed between the parallel snubber circuitry coil and the converter coil.

Also disclosed is a power converter including power conversion circuitry including a converter coil associated with a power supply and a switch configured with a power conversion circuitry output to a converter load associated with the power converter. The power converter includes parallel snubber circuitry associated with the converter coil having a parallel snubber circuitry coil disposed in parallel with the converter coil with respect to the power supply, a parallel snubber diode disposed between the parallel snubber circuitry coil and the converter coil biased to enable less restrictive current flow from the parallel snubber circuitry coil to the converter coil than from the converter coil to the parallel snubber circuitry coil, and a capacitor disposed between the parallel snubber circuitry coil and the converter coil. The power converter includes series snubber circuitry having a series snubber circuitry output configured in series with a parallel snubber circuitry output of the parallel snubber circuitry in series with the power conversion circuitry output forming a power converter output voltage having a predetermined voltage.

BRIEF DESCRIPTION OF THE DRAWINGS

The following descriptions should not be considered limiting in any way. With reference to the accompanying drawings, like elements are numbered alike:

FIG. 1A is a schematic a power supply and a switch of a power converter;

DETAILED DESCRIPTION

A detailed description of one or more embodiments of the disclosed apparatus and method are presented herein by way of exemplification and not limitation with reference to the Figures.

Switched-mode power supplies may include a voltage source and a converter coil (or coils) configured to output the desired voltage based on a switching frequency of a switch associated with the converter coil. The switch may experience stress from voltage transients associated with current flow disruptions. As such, a snubber circuit may be implemented to reduce the transients.

Figure 1B:
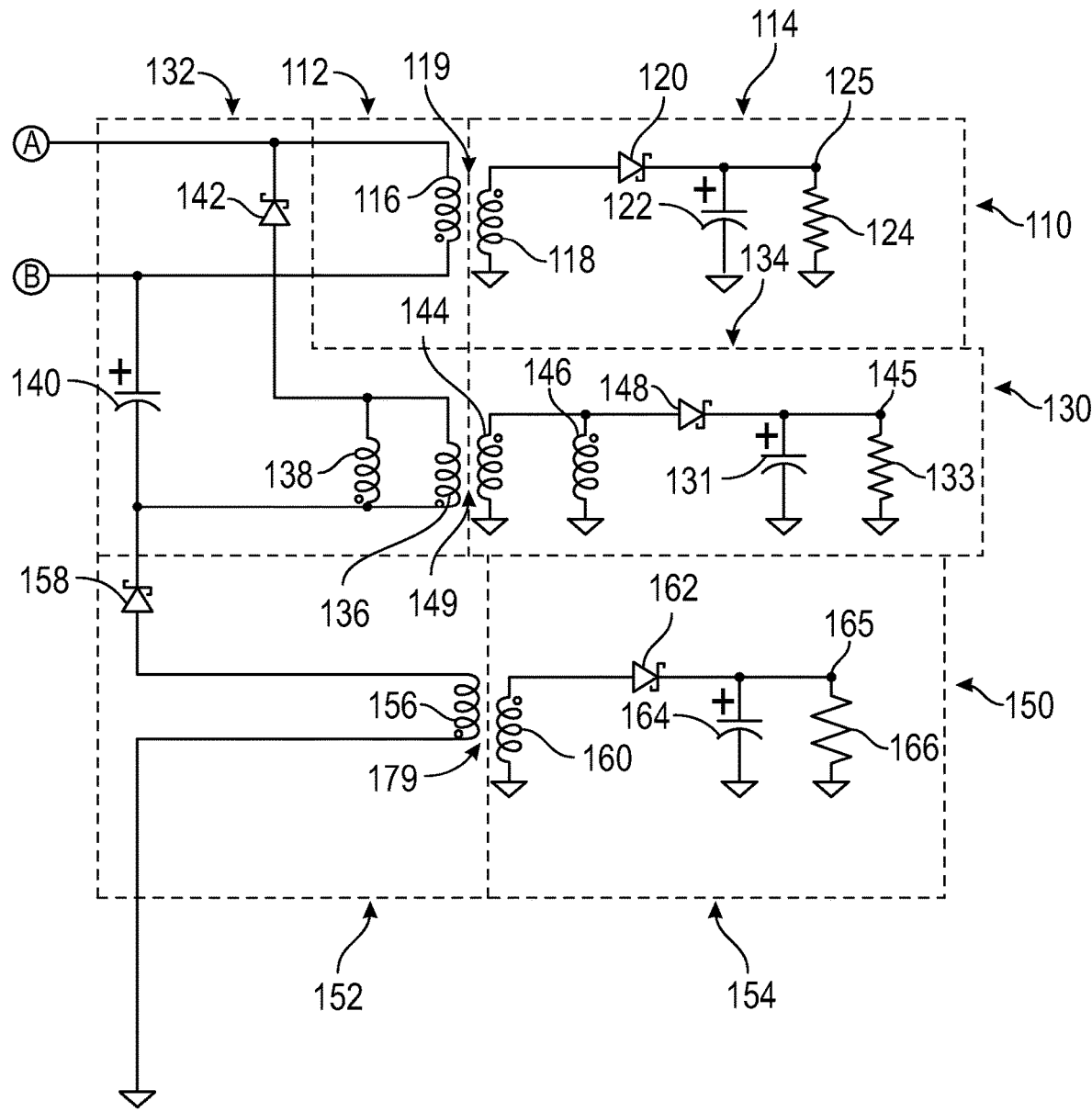
FIG. 1B is a schematic of a power converter circuitry.

Referring to FIG. 1, a power converter 100 is shown. The power converter 100 includes power conversion circuitry 110. This can formed as a single coil or, as illustrated, as a transformer (119) that includes a primary side 112, a secondary side 114. Regardless of the implementation, the power conversion circuitry 110 includes a switching portion 113 that is connected to the power conversion circuitry 110 and to a power source 104. In one embodiment, the power source 104 provides DC power and may be a battery. The switching portion 113 may include DC-link capacitor 106. The DC-link capacitor 106 may reduce fluctuations in voltage provided to the power conversion circuitry 110 by the power source 104. The switching portion 113 may include a switch 102 or oscillator. The switch 102 may be associated with or operated according to a predetermined oscillation frequency.

The switch 102 may open and close based on associated resistors 108 or be otherwise driven by a gate driver. As such, the switch 102 in the closed position may allow current flow from the inductor to ground, and the switch 102 in the open position may inhibit or reduce such current flow through the inductor. The switch 102 may be any type of switching mechanism, including transistors or integrated circuits. The switch 102 can be connected between the power source 104 and a converter coil 116 or first power conversion winding or may connected between the converter coil 116 and a reference or ground as illustrated in FIG. 1.

The converter coil 116 may be any type of inductor or coil. The converter coil 116 may be standalone and connected directly to a converter load 124 or associated with any type of transformer 119 and secondary side 114 to provide voltage to converter output 125. As illustrated, the secondary side 114 includes a secondary side coil 118 or second power conversion winding, a converter diode 120 and a power converter output capacitor 122 to properly converter the power source 104 to the power conversion circuitry output 125 that is a voltage associated with the converter load 124 of power conversion circuitry 110. A winding ratio of the converter coil 116 to the secondary side coil 118 may be 9:4. The configuration may include ratios that are either a step-up or a step-down. The converter coil 116 and the secondary side coil 118 may form power conversion transformer 119. The switch 102 may be configured to control current flowing through the converter coil 116 such that the output 125 is a voltage as desired.

As such, as the switch 102 is turned on for the first time, current flows from the power source 104 through the converter coil 116 and at least one of the resistors 108 to ground. The switch 102 may be associated with or operated according to a predetermined oscillation frequency or actuation frequency that is determined by the ratio of R3. It should be appreciated that the switch 102 may be any type of switching device including transistors. The oscillation frequency may be equal or greater than a resonant frequency of the snubber capacitor 140 and the parallel snubber circuitry coil 136. The oscillation frequency may be slightly greater than the resonant frequency of the snubber capacitor 140 and the parallel snubber circuitry coil 136.

The power converter 100 may include parallel snubber circuitry 130, including parallel snubber circuitry transformer 149, parallel snubber circuitry output side 134, and resonant circuitry 132 connected in parallel with the converter coil 116. The resonant circuitry 132 may include a parallel snubber circuitry coil 136 or first parallel coil connected in series or pseudo series with snubber capacitor 140. The snubber capacitor 140 may have a capacitance of five microfarads. That is, the parallel snubber circuitry coil 136 is connected to converter coil 116 such that respective terminal voltages across are similar. Further, the parallel snubber circuitry coil 136 and the snubber capacitor 140 form a series resonant system having a resonant frequency according to Equation 1.

$$f_r = \frac{1}{2\pi\sqrt{LC}} \quad (1)$$

The inductance of the parallel snubber circuitry coil 136 may be 10 microhenries. The snubber capacitor 140 peak voltage may be determined as Equation 2.

$$V_{C2} = \Delta V_{SW1} + n_1 V_{out1} \quad (2),$$

where $\Delta V_{SW1}$ is the additional voltage stress over the switch 102, and $n_1$ is the transformation ratio of the transformer 119 and $V_{out1}$ is the respective output 125.

The parallel snubber circuitry output side 134 includes a second parallel coil 144 associated with the parallel snubber circuitry coil 136 to form parallel snubber circuitry transformer 149. It should be appreciated that any type of resonant system may be used including those not associated with transformers. The second parallel coil 144 may be associated with other parallel snubber circuitry output side 134 components including parallel snubber circuitry output diode 148, output capacitor 131 and may be connectable to parallel snubber circuitry load 133. The parallel snubber circuitry output side 134 may include a parallel snubber circuitry output 145 having a voltage defined by the parallel snubber circuitry 130. The parallel snubber circuitry coil 136 may be a first portion or first winding portion of a bifilar winding associated with the second primary bifilar winding portion 138. The parallel snubber circuitry coil 136 may be a first portion of a bifilar winding associated with the second bifilar winding portion 138 may have a combined inductance of 10 microhenries. The second parallel coil 144 may be a first portion of a bifilar winding associated with a second secondary bifilar winding portion 146.

As such, as the switch 102 is turned off for the first time, current may flow through the converter secondary side 114 with converter output 125 as a voltage. Current will additionally flow through the snubber capacitor 140 through the parallel snubber circuitry coil 136 and parallel snubber diode 142 to the converter coil 116.

The parallel snubber diode 142 may be any type of diode, including a Schottky type. The parallel snubber diode 142 may be disposed on conductive path 143 between the converter coil 116 and the parallel snubber circuitry coil 136. The parallel snubber diode 142 may be biased to enable less restrictive current flow from the parallel snubber circuitry coil 136 to the converter coil 116 than from the converter coil 116 to the parallel snubber circuitry coil 136.

The parallel snubber circuitry coil 136 and snubber capacitor 140 may be chosen such that they operate in a series resonant mode that achieves less impedance during a freewheeling period. That is, the switching frequency of switch 102 may be chosen to be equal or faster, possibly slightly faster, than the resonant frequency as defined in Equation 1 with respect to the parallel snubber circuitry coil 136 and snubber capacitor 140. As an example, the parallel snubber circuitry coil 136 may an inductance of ten microhenries. The snubber capacitor 140 may have a capacitance of five microfarads.

The power converter 100 may include series snubber circuitry 150, including series snubber circuitry transformer 179, series snubber circuitry input side 152, and series snubber circuitry output side 154. The series snubber circuitry input side 152 includes a series snubber circuitry input coil 156, series inductor, or first series snubber winding in series with the snubber capacitor 140 and series snubber diode 158. The snubber capacitor 140 and the series snubber circuitry input coil 156 form an LC snubber and are connected with the converter coil 116 in series or pseudo series such that current flows from the series snubber circuitry input coil 156 through series snubber diode 158 and the series associated snubber capacitor 140 through the switch 102. It should be appreciated that the parallel snubber circuitry 130 and the series snubber circuitry 150 may share snubber capacitor 140 to provide the necessary snubbing capabilities. As such, the snubber capacitor 140 may be configured in such a way as to provide dual purposed capacitance to the resonant circuits of the parallel snubber circuitry and the series snubber circuitry.

The series snubber circuitry output side 154 associated with series snubber circuitry transformer 179 may include a series output coil 160, second series snubber winding, or series snubber secondary winding. Series snubber circuitry transformer 179 may be a flyback transformer. It should be appreciated that any converter or flyback converter shown may be configured as a forward converter (not shown). It should be appreciated that the transformer 179 may be replaced by any other type of switched-mode power supply and that a flyback, as shown, may be implemented in a variety of ways. Further, the series snubber circuitry output side 154 may include a series snubber diode 162 and a series snubber circuitry output capacitor 164 associated with series snubber circuitry output 165 as a voltage and series snubber circuitry load 166.

Figure 2:
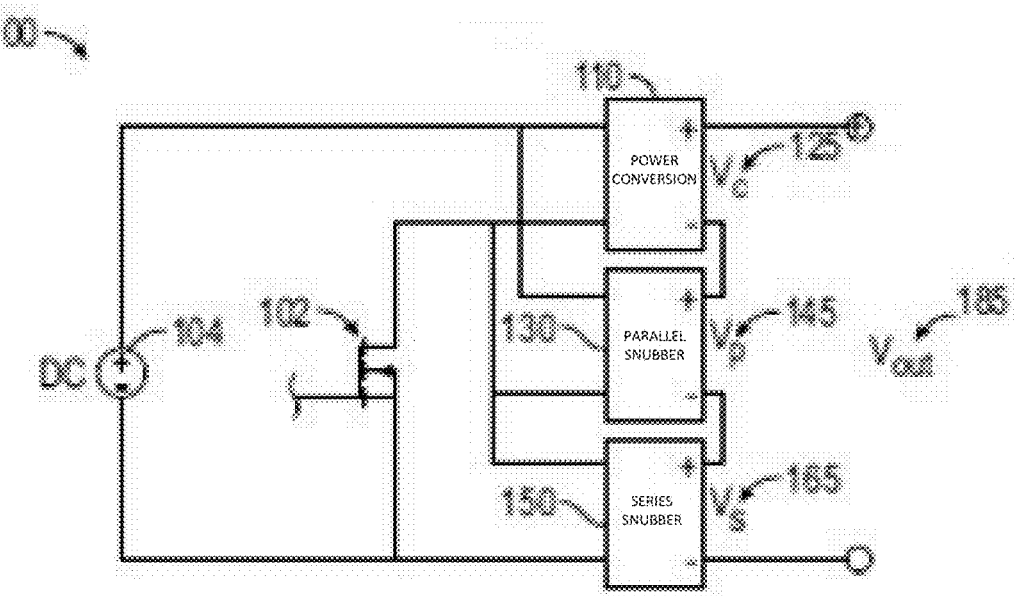
FIG. 2 is a schematic of a power converter output voltage associated with a load.

Referring to FIG. 2, the power converter 100 is shown having power source 104 and switch 102 in a schematic diagram. The switch 102 may be driven or operated by a gate driver and a controller. As shown, the power conversion circuitry 110, parallel snubber circuitry 130, and series snubber circuitry 150 are shown. As should be appreciated, each of the circuitries 110, 130, 150 may be any type of switched-mode power supply circuits and associated circuitry including or not including transformers.

The power conversion circuitry 110, parallel snubber circuitry 130, and series snubber circuitry 150 are associated with outputs 125, 145, 165, respectively, where the converter output 125 is a voltage produced by the power conversion circuitry 110, the parallel snubber output 145 is a voltage produced by the parallel snubber circuitry 130 and the series snubber output 165 is a voltage produced by the series snubber circuitry 150. As such, the outputs 125, 145, 165 may be combined in series to increase the voltage output 185 of the power converter having a predetermined voltage. Additionally, any of the outputs 125, 145, 165 may be inverted to reduce the voltage output 185. That is, reverse polarity may be used on any of the diodes associated with the power conversion circuitry 110, parallel snubber circuitry 130, and series snubber circuitry 150 to create the desired output voltage. The power conversion circuitry 110, parallel snubber circuitry 130, and series snubber circuitry 150 may further be associated in parallel. For example, the power conversion circuitry polarity and the parallel snubber circuitry polarity may be the same and opposite of the series snubber circuitry polarity to reduce the voltage output 185 by the series snubber circuitry output 165.

Figure 3:
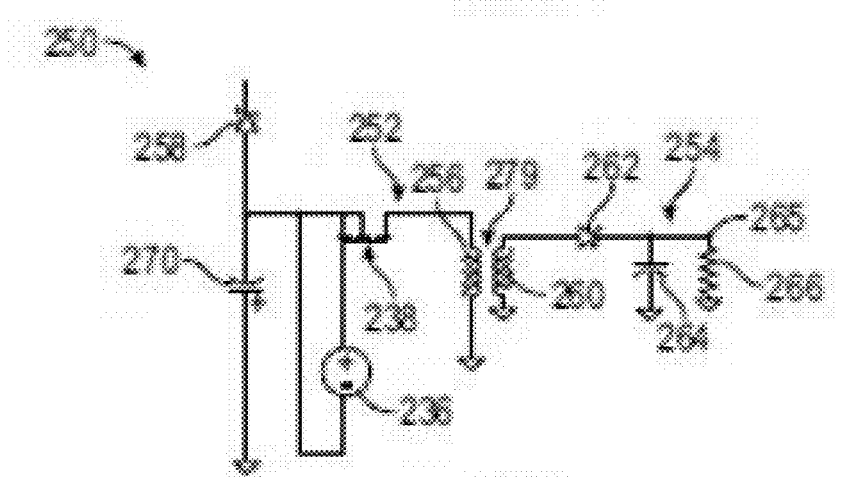
FIG. 3 is a schematic of a switched snubber circuit associated with a power converter.

Referring to FIG. 3, series snubber circuitry 250 is shown. The power converter 100 may include series snubber circuitry 250, including series snubber circuitry transformer 279, series snubber circuitry input side 252, and series snubber circuitry output side 254. The series snubber circuitry input side 252 may include a series snubber circuitry input coil 256 in series with the snubber capacitor 140 (not shown) and series snubber diode 258. The snubber capacitor 140 and the series snubber circuitry input coil 256 form a series resonant snubber and are connected with the converter coil 116 in series or pseudo series such that current from the power source 104 flows from the series snubber circuitry input coil 256 through series snubber diode 258 and the series associated snubber capacitor 140 through the switch 102. The current may be controlled by pulsed power supply 236 configured as a gate driver for series snubber switch 238.

The series snubber circuitry output side 254 associated with transformer 279 may include a series output coil 260. It should be appreciated that the transformer 279 may be replaced by any other type of switched-mode power supply and that a flyback, as shown, may be implemented in a variety of ways. Further, the series snubber circuitry output side 254 may include a series snubber diode 262 and a series snubber output capacitor 264 associated with series snubber circuitry output 265 as a voltage and series snubber circuitry output load 266.

Figure 4:
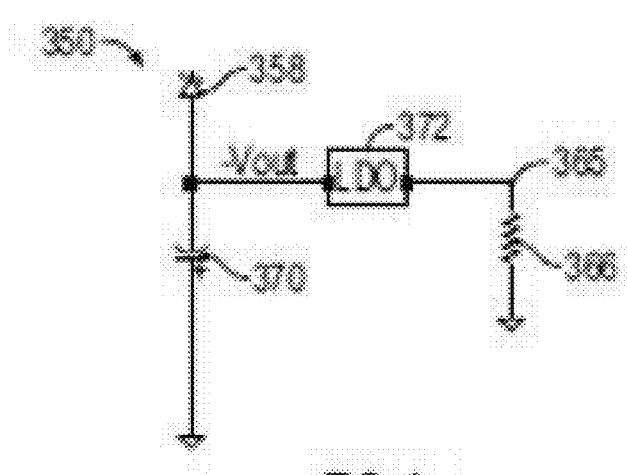
FIG. 4 is a schematic of a low dropout snubber circuit associated with a power converter.

Referring to FIG. 4, series snubber circuitry 350 is shown. The series snubber circuitry 350 may include a series snubber circuitry low dropout voltage regulator 372 or another other type of voltage regulator in series with the snubber capacitor 140 (not shown) and series snubber diode 358 and may be associated with low dropout capacitor 370. The low dropout voltage regulator 372 may provide output voltage 365 associated with series snubber output 366.

Figure 5:
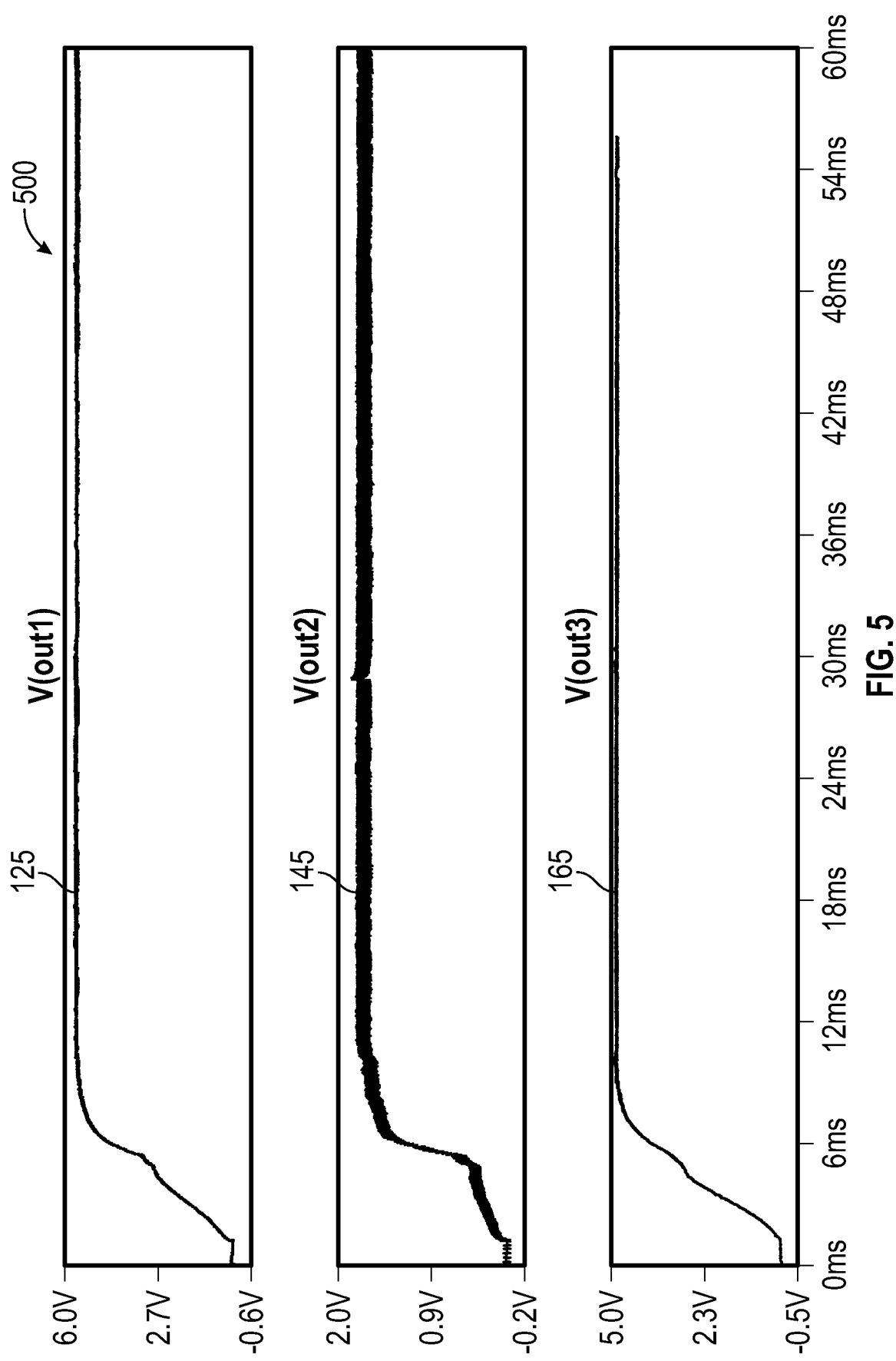
FIG. 5 is a graph of an output voltage of a power converter having snubber circuitry.

Referring to FIG. 5, a graph 500 is shown. The graph 500 includes output voltages associated with the power conversion circuitry 110, the parallel snubber circuitry 130, and the series snubber circuitry 150, where the converter output 125 is a voltage produced by the power conversion circuitry 110, the parallel snubber output 145 is a voltage produced by the parallel snubber circuitry 130 and the series snubber output 165 is a voltage produced by the series snubber circuitry 150. The power source 104 may, as one example, be a 30-volt direct current source having associated outputs 125, 145, 165 that equal about 12 volts in series.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power converter comprising:
   power conversion circuitry including:
   a converter coil,
   a power source, and
   a switch connected to the converter coil to control current flowing through the converter coil from the power source, the power conversion circuitry including a converter output connectable to a converter load; and
   parallel snubber circuitry having resonant circuitry connected in parallel with the converter coil, the resonant circuitry including a parallel snubber circuitry coil and a capacitor connected in series, the parallel snubber circuitry including a parallel snubber output connectable to a parallel snubber circuitry load, and
   wherein the power converter further comprises series snubber circuitry associated with the converter coil including a series inductor disposed in series with the converter coil and the capacitor with respect to the power source, and a series snubber diode disposed between the parallel and converter coil.

2. A power converter comprising:
   power conversion circuitry including:
   a converter coil,
   a power source, and
   a switch connected to the converter coil to control current flowing through the converter coil from the power source, the power conversion circuitry including a converter output connectable to a converter load; and
   parallel snubber circuitry having resonant circuitry connected in parallel with the converter coil, the resonant circuitry including a parallel snubber circuitry coil and a capacitor connected in series, the parallel snubber circuitry including a parallel snubber output connectable to a parallel snubber circuitry load,
   wherein the power converter further comprises series snubber circuitry associated with the converter coil including a low dropout voltage regulator in series with the converter coil with respect to the power source.

3. A power converter comprising:
   power conversion circuitry including:
   a converter coil,
   a power source, and
   a switch connected to the converter coil to control current flowing through the converter coil from the power source, the power conversion circuitry including a converter output connectable to a converter load; and
   parallel snubber circuitry having resonant circuitry connected in parallel with the converter coil, the resonant circuitry including a parallel snubber circuitry coil and a capacitor connected in series, the parallel snubber circuitry including a parallel snubber output connectable to a parallel snubber circuitry load,
   wherein the power converter further comprises series snubber circuitry associated with the converter coil including a flyback transformer in series with the converter coil with respect to the power source.

4. The power converter of claim 3, wherein the series snubber circuitry has a series snubber circuitry voltage output with a series snubber circuitry voltage polarity opposite a power conversion circuitry polarity of the power conversion circuitry such that a power converter output voltage of the power converter is less the series snubber circuitry voltage output.

5. The power converter of claim 4, wherein the flyback transformer includes a load side having series snubber circuitry secondary winding, a series snubber circuitry load, and a series snubber diode disposed is biased to enable less restrictive current flow from the series snubber circuitry load to the series snubber circuitry secondary winding than from the series snubber circuitry secondary winding to the series snubber circuitry load.

6. A power converter comprising:
power conversion circuitry including:
a converter coil,
a power source, and
a switch connected to the converter coil to control current flowing through the converter coil from the power source, the power conversion circuitry including a converter output connectable to a converter load; and parallel snubber circuitry having resonant circuitry connected in parallel with the converter coil, the resonant circuitry including a parallel snubber circuitry coil and a capacitor connected in series, the parallel snubber circuitry including a parallel snubber output connectable to a parallel snubber circuitry load, wherein the power converter further comprises series snubber circuitry having a series snubber circuitry output configured in series with a parallel snubber circuitry output of the parallel snubber circuitry in series with the converter output.

7. The power converter of claim 6, wherein the series snubber circuitry includes a series snubber circuitry transformer having a winding ratio of 13:5 between a first series snubber winding and a second series snubber winding.

8. The power converter of claim 6, wherein the power conversion circuitry includes a power conversion transformer having a winding ratio of 13:5 between a first power conversion winding and a second power conversion winding.

* * * * *